United States Patent Office 3,425,464
Patented Feb. 4, 1969

3,425,464
FLUID FILLING METHOD AND APPARATUS
Walton Hughes, Scotch Plains, N.J., assignor to General Motors Corporation, Detroit, Mich., a corporation of Delaware
Filed Jan. 17, 1967, Ser. No. 609,799
U.S. Cl. 141—7
Int. Cl. B65b *31/00, 1/04*
20 Claims

ABSTRACT OF THE DISCLOSURE

This invention relates to a method and apparatus for filling a fluid system and more particularly to such a method and apparatus employing a filling cycle having an evacuating phase, a pressurized overfilling phase and a terminating withdrawal phase to remove excess fluid.

---

Figure 1:
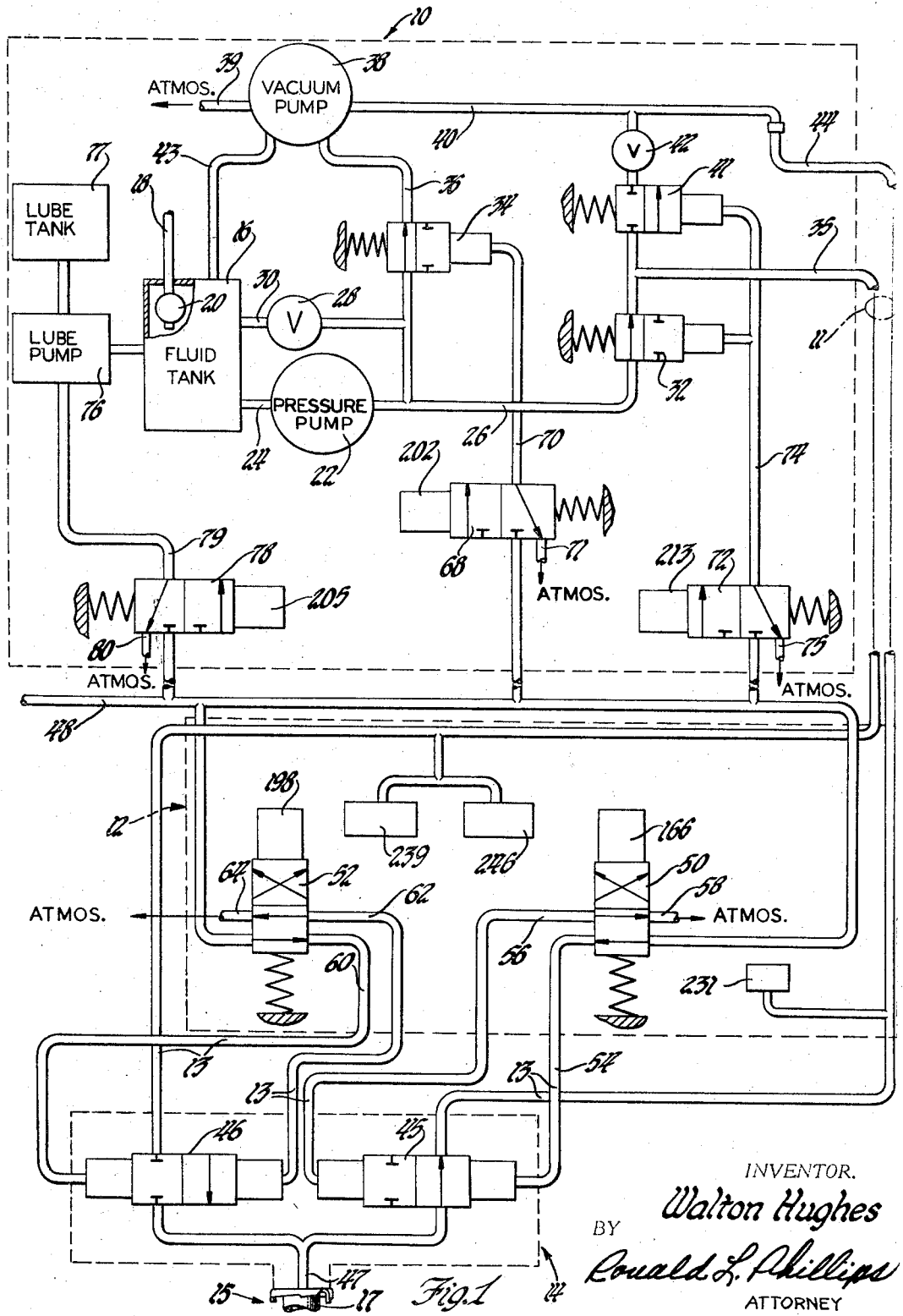

There are several difficult problems found in rapidly filling fluid systems of complex configurations particularly where it is desired to accurately fill such systems having the same volume and different volumes without adjusting or changing the filling operation. In conventional filling operations which fill under atmospheric pressure conditions and then terminate the fluid flow leaving a condition approaching fluid pressure balance with the atmosphere, the fluid flow rate is slow. When fast flow rates to such systems are attempted, a back pressure from the syestem is developed which pressure prematurely signals that the system is full resulting in an incomplete or inaccurate fill.

The present invention is particularly well suited for filling fluid systems of complex configuration such as a motor vehicle's cooling system and is especially useful on a vehicle final assembly line as will be demonstrated. Apparatus for carrying out the process of the present invention comprises a hydraulic pump having a pressure regulator valve and a vacuum pump whose connections to the system to be filled are automatically controlled in a predetermined sequence by an electrical circuit which is controlled by pressure signals to provide a predetermined percentage fill. The hydraulic and vacuum pump are connected to flexible hoses which are normally closed by separate valves at a single fill head. The fill head is sealingly connected to the inlet of the system to be filled which may be a motor vehicle's cooling system with the connection at the radiator fill neck. The operator initiates operation of the automatically sequenced cycle and the vacuum pump is connected in an evacuating phase to evacuate the air in the cooling system down to a given vacuum which is determined by a vacuum signal so that a predetermined percentage of air remains in the cooling system. Upon termination of the evacuating phase, the cooling system is then automatically filled with coolant in a fluid overfilling phase by the hydraulic pump. The hydraulic pump fills the system at a constant volumetric rate to a superatmospheric pressure which is determined by a pressure overfull signal causing the remaining air in the cooling system to be compressed to achieve a slight fluid overfull condition. The superatmospheric pressure and accordingly the fluid overfilling operation is determined to provide for a fast and complete fill with a sufficient excess quantity of fluid left in the cooling system for bleed-off so a slow flow rate can be used to generate an accurate termination pressure signal. The filling apparatus responds to the overfull pressure signal to condition itself in a fluid withdrawal phase to slowly withdraw the excess fluid through the hydraulic hose and a metering valve by the vacuum pump until the cooling system pressure drops to atmospheric pressure as determined by a terminating pressure signal.

An object of the present invention is to provide a new and improved fluid filling method and apparatus.

Another object is to provide a fluid filling method and apparatus employing a filling cycle having an evacuating phase, a pressurized overfilling phase and a terminatiing withdrawal phase to remove excess fluid.

Another object is to provide a fluid filling method and apparatus for automatically filling a fluid system of complex configuration by evacuating the system to be filled down to a predetermined vacuum so that a given percentage of air remains, filling the system with fluid to a superatmospheric pressure to achieve a slight overfull condition and withdrawing the excess fluid from the system until the system pressure reaches atmospheric pressure.

Another object is to provide a fluid filling method and apparatus employing a superatmospheric pressure for a fast overfill of an evacuated fluid system leaving a small quantity of fluid to be bled off to provide a slow withdrawal flow rate to generate an accurate termination pressure.

Another object is to provide a fluid filling method and apparatus for automatically filling a motor vehicle's cooling system by partially evacuating the cooling system, filling the cooling system with coolant under superatmospheric pressure at a constant volumetric rate so that the remaining air in the system is compressed with a slight overfull condition is achieved and withdrawing the excess fluid at a slow flow rate which is used to generate an accurate termination pressure signal.

These and other objects of the present invention will be more apparent from the following description and drawing in which:

FIGURE 1 schematically illustrates the fluid filling hydraulic and pneumatic apparatus for carrying out the filling process of the present invention.

FIGURE schematically illustrates the electrical circuit for automatically controlling the hydraulic and pneumatic apparatus shown in FIGURE 1.

The present invention is demonstrated for use in filling motor vehicle cooling systems on a final assembly line. In this application of the invention the fluid filling hydraulic and pneumatic apparatus is divided into three major subassemblies to reduce both operator effort and strain at the connection to the moving cooling system on the assembly line. Referring to FIGURE 1, the stationary power unit subassembly generally designated at 10 is comprised of the pumps, fluid storage tank, the majority of the hydraulic and pneumatic components associated therewith and the electrical components therefor and is located near the final assembly conveyor to reduce fluid friction losses between the pressure and vacuum sources and the cooling system to be filled.

The power unit 10 is connected by a flexible messenger hose assembly 11 to a movable, support and control station subassembly generally designated at 12 which is supported by a lead trolley (not shown) riding an overhead rail on the operator's side of the conveyor. Another flexible messenger hose assembly 13 which includes hose assembly 11 extends from the support and control station 12 to a fill head subassembly generally designated at 14.

The fill head 14 has slave valves controlled by pilot valves at the support and control station 12 so that the fill head connects both the hydraulic and vacuum pumps via the hose assemblies through a single fill head line to the cooling system to be filled. This structural arrangement provides a minimum volume between the fill head valves and the system being filled to reduce fluid spillage and minimum fill head size and weight for easy handling by the operator. The fill head 14 is connected by the operator to an inlet of the system to be filled which in the case of a motor vehicle cooling system generally designated as 15 is normally at the radiator fill neck 17.

The lead trolley supporting the support and control station 12 is preferably propelled by an air tractor (not shown) having a suitable control so that the messenger hose assembly 11 extending between the power unit 10 and the moving station 12 is pulled by the lead trolley and not by the radiator fill neck to minimize strain on the radiator and also reduce operator effort.

The power unit 10 has a fluid tank 16 fed with coolant which may be an antifreeze mix via a supply line 18 through a float valve 20 so that the tank is maintained approximately one-half full at all times. An electric motor driven hydraulic pump 22 of the positive displacement type receives the coolant from the tank through a suction line 24 and discharges the coolant under pressure to a main line 26 where the pressure of the coolant is regulated by a regulator valve 28 which exhausts excess coolant via an exhaust line 30 back to tank 16. Main line 26 is connected to pneumatically operated slave valves 32 and 34 which are a part of unit 10. Valve 32 is operable to connect and disconnect the main line 26 and the flexible hose 35 of hose assemblies 11 and 13 which hose extends to the fill head 14 and is supported at the moveable station 12 at an intermediate point close to the fill head. Valve 34 is operable to connect and disconnect the main line 26 and a vacuum pump supply line 36 which is connected to an electric motor driven vacuum pump 38. Vacuum pump 38 is preferably of the aspirating type and requires a supply of fluid to actuate the jet which exhausts to the atmosphere through line 39 to establish a vacuum in vacuum line 40 and also cool the system. A pneumatically operated slave valve 41 which is a part of unit 10 is operable to connect the flexible coolant hose 35 through a fluid metering needle valve 42 to the vacuum line 40 for excess coolant withdrawal from the cooling system being filled and also to disconnect coolant hose 35 and vacuum line 40. The coolant supplied to the vacuum pump 38 by supply line 36 and the excess coolant which is bled back from the cooling system by the vacuum pump as described in greater detail later is returned via a vacuum pump return line 43 to tank 16. Vacuum line 40 is connected to the other flexible hose 44 of hose assembly 11 which hose extends to the fill head 14 and is supported at the moveable station 12 at an intermediate point close to the fill head. The pneumatically operated slave valves 45 and 46 in the fill head 14 are operable to connect and disconnect the vacuum hose 44 and coolant hose 35, respectively, to a fill head line 47. The fill head 14 is provided with a suitable seal to effect a sealed joint at the connection of the fill head line 47 to the radiator fill neck.

The supply of air pressure to operate the above described pneumatically operated slave valves is provided by any suitable air pressure source and delivered to a flexible main air pressure hose 48. Pressure from the main air hose 48 is delivered by solenoid pilot valves to the pneumatically operated slave valves as will now be described.

The solenoid pilot valves 50 and 52 supported at moveable station 12 control operation of the fill head valves 45 and 46, respectively. When pilot valve 50 is de-energized as shown it is spring biased to connect both the main air hose 48 to a flexible hose 54 communicating with one pressure side of the fill head vacuum valve 45 and a flexible hose 56 communicating with the opposite pressure side of valve 45 to an exhaust port 58 exhausting to atmosphere. With these connections the fill head vacuum valve 45 is conditioned by air pressure in its open position as shown to connect the vacuum hose 44 to fill head line 47. When pilot valve 50 is energized, it connects hose 54 to exhaust port 58 and hose 56 to the main air hose 48 so that the air pressure conditions the fill head vacuum valve 45 in its closed position to disconnect the vacuum hose 44 from fill head line 47. When pilot valve 52 is de-energized as shown it is spring biased to connect both the main air hose 48 to a flexible hose 60 communicating with one pressure side of the fill head coolant valve 46 and a flexible hose 62 communicating with the opposite pressure side of valve 46 to an exhaust port 64 exhausting to atmosphere so that the air pressure conditions valve 46 in its closed position as shown to disconnect the coolant hose 35 from fill head line 47. When pilot valve 52 is energized, it connects the main air hose 48 to hose 62 and hose 60 to exhaust port 64 so that the fill head coolant valve 46 is conditioned by the air pressure in its open position to connect the coolant hose 35 to fill head line 47. The hoses 54, 56, 60 and 62 are the remaining hoses of hose assembly 13.

The solenoid pilot valve 68 which is a part of the power unit 10 controls the operation of valve 34. When valve 68 is de-energized as shown it is spring biased to connect a line 70 communicating with the pressure side of valve 34 to atmospheric exhaust port 71 and disconnect the main air hose 48 from line 70. Valve 34 which has a spring bias is biased to its open position as shown to connect the main coolant line 26 to vacuum pump 38. When pilot valve 68 is energized it connects main air hose 48 to line 70 and disconnects line 70 from exhaust port 71 so that the air pressure conditions valve 34 in its closed position to disconnect the main coolant line 26 from vacuum pump 38.

The solenoid pilot valve 72 which is a part of power unit 10 controls the operation of both valves 32 and 41. When pilot valve 72 is de-energized as shown it is spring biased to its closed position to connect a line 74 communicating with the pressure sides of both valves 32 and 41 to an atmospheric exhaust port 75 and disconnect main air hose 48 from line 74. With the pressure sides of valves 32 and 41 exhausted to atmosphere, valve 32 is spring biased to its open position as shown to connect the main coolant line 26 to the coolant hose 35 and valve 41 is spring biased to its closed position as shown to disconnect the coolant hose 35 from the vacuum line 40. When pilot valve 72 is energized it connects main air hose 48 to line 74 and disconnects line 74 from exhaust port 75 so that the air pressure is delivered to the pressure sides of valves 32 and 41. Valve 32 is conditioned by the air pressure in its closed position to disconnect the coolant hose 35 from the main coolant line 26 and valve 41 is conditioned by the air pressure in its open position to connect the coolant hose 35 to vacuum line 40.

A lubricating pump 76 supplied with lubricant from a lubricant tank 77 is a part of power unit 10 and is operable upon air pressure supply to discharge a predetermined amount of lubricant into the fluid tank 16 to lubricate the downstream system. The solenoid pilot valve 78 which is also a part of the power unit 10 controls the supply of air to the lubricating pump 76. When pilot valve 78 is de-energized it is spring biased as shown to connect an air line 79 communicating with pump 76 to an atmospheric exhaust port 80 and to disconnect the main air hose 48 from line 79. When pilot valve 78 is energized it connects the main air hose 48 to the line 79 and disconnects the line 79 from exhaust port 80 to thereby supply the air pressure to operate pump 76.

Figure 2:
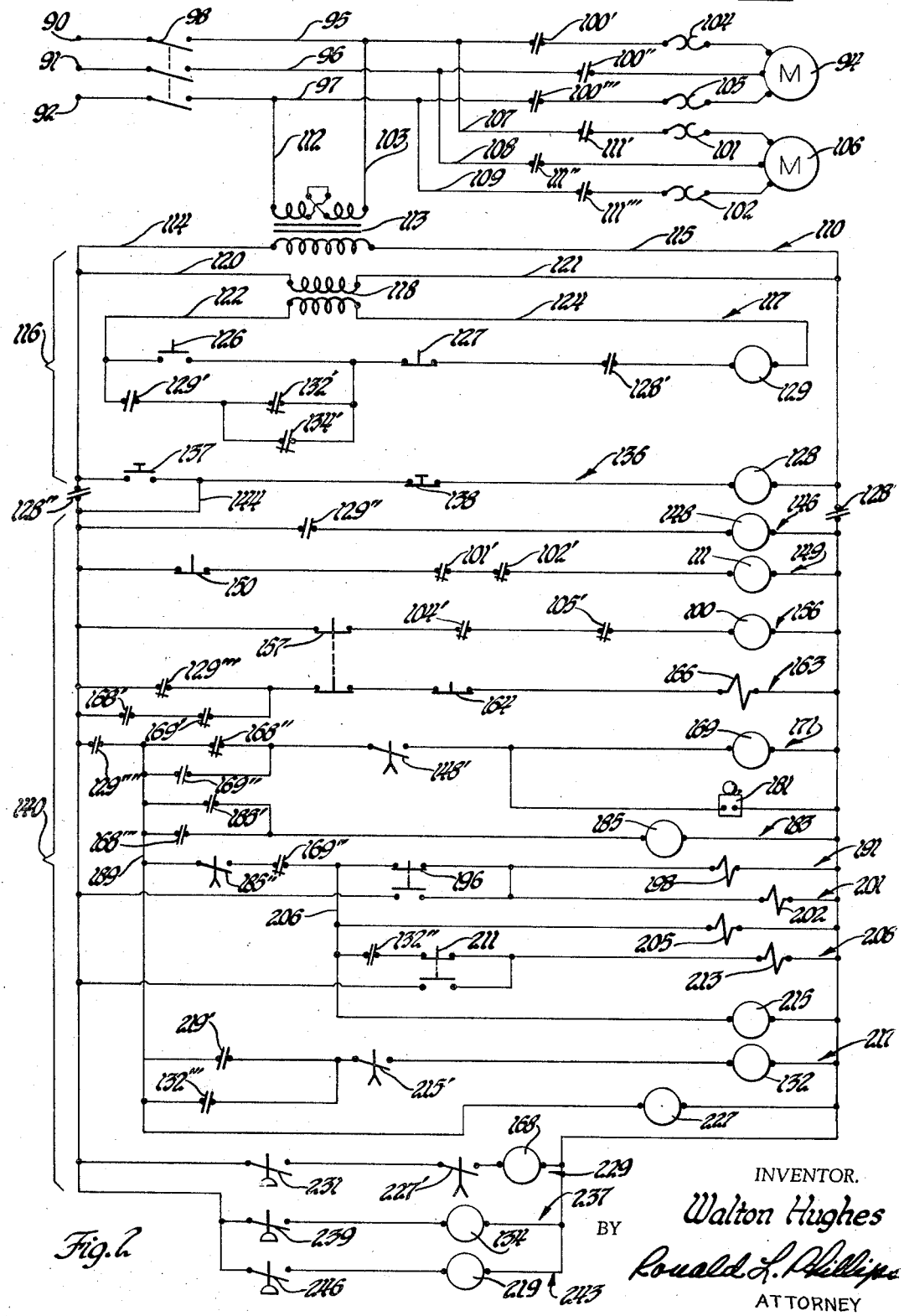

The hydraulic and pneumatic apparatus described above is automatically controlled according to a predetermined sequence by the electrical circuit shown in FIGURE 2. In the following description the same numeral is used to identify a relay coil and the one or more contacts it controls but with the contact identifying numeral primed.

The electrical circuit has three input terminals 90, 91 and 92 for connection to a three-phase power source. A three-phase motor 94 which is a part of the power unit 10 is connected to drive the vacuum pump 38 and is connected to the input terminals 90, 91 and 92 by means of lines 95, 96 and 97, respectively, and a three-pole disconnect switch 98. Normally open relay contacts 100', 100"

and 100''' are provided in lines 95, 96 and 97, respectively, and thermo overload elements 104 and 105 are also provided in lines 95 and 97, respectively.

A three-phase motor 106 which is a part of the power unit 10 is connected to drive the hydraulic pump 22. The hydraulic pump motor 106 is connected in parallel with the vacuum pump motor 94 by means of lines 107, 108 and 109 which are connected to lines 95, 96 and 97, respectively, at points intermediate the disconnect switch 98 and the vacuum pump motor relay contacts. Normally open relay contacts 111', 111'' and 111''' are provided in lines 107, 108 and 109, respectively, and thermal overload elements 101 and 102 are also provided in lines 107 and 109, respectively, intermediate the associated relay contacts and the motor.

The control circuit for the electric motors and the solenoid pilot valves is generally designated at 110 and has an input stepdown transformer 113. The primary winding terminals of control transformer 113 are connected to the input terminals 90 and 92 by means of lines 103 and 112 which are connected to lines 95 and 97, respectively, at points intermediate the disconnect switch 98 and the associated motor relay contacts. The terminals of the secondary winding of transformer 113 are connected to lines 114 and 115. In the upper portion 116 of the single phase control circuit 110 there is provided an automatic cycle start and hold circuit generally designated at 117 which has an input stepdown voltage transformer 118 whose primary winding terminals are connected by lines 120 and 121 to lines 114 and 115, respectively. The secondary winding terminals of transformer 118 are connected to lines 122 and 124. In the automatic cycle start and hold circuit 117 there is provided a normally open push button operator start switch 126, a normally closed push button operator stop switch 127, a normally open relay contact 128' and a relay coil 129 which are connected in series across lines 122 and 124. A normally open relay contact 129' controlled by relay coil 129 and a pair of parallel connected normally closed relay contacts 132' and 134' are connected in series across the operator start switch 126.

A master start and hold circuit generally designated at 136 comprises a normally open push button master start switch 137, a normally closed push button master stop switch 138 and a relay coil 128 which are connected in series across lines 114 and 115 in the upper circuit portion 116. The upper circuit portion 116 is connected to the lower circuit portion 140 by means of normally open relay contacts 128'' and 128''' in lines 114 and 115, respectively. The relay coil 128 controls contact 128' in the automatic start and hold circuit 117 and also the relay contacts 128'' and 128''' for connecting the upper circuit portion 116 to the lower circuit portion 140. The master stop switch 138 and relay coil 128 are also connected across the master start switch 137 by a line 144 to line 114 in the lower circuit portion 140.

In the lower circuit portion 140 there is provided an automatic cycle start and hold and delay circuit 146 for a no vacuum alarm later described which circuit 146 is comprised of a normally open relay contact 129'' controlled by relay coil 129 in the automatic start and hold circuit 117 and a relay coil 148. Contact 129'' and coil 148 are connected in series across lines 114 and 115.

The circuit 149 controls the hydraulic pump motor 106 and comprises a normally closed switch 150, normally closed relay contacts 101' and 102' controlled by the motor's thermo overload elements 101 and 102, respectively, and a relay coil 111 controlling the motor's relay contacts 111', 111'' and 111'''. The components 150, 101', 102' and 111 are connected in series across lines 114 and 115 in the lower circuit portion 140.

The circuit 156 controls the vacuum pump motor 94 and comprises a normally closed double-pole switch 157, normally closed relay contacts 104' and 105' controlled by the motor's thermo overload elements 104 and 105, respectively, and a relay coil 100 for controlling the motor's relay contacts 100', 100'' and 100'''. The components 157, 104', 105' and 100 are connected in series across lines 114 and 115 in the lower circuit portion.

The circuit 163 is for the vacuum pilot solenoid valve 50 and comprises a normally closed relay contact 129''' controlled by relay coil 129 in the automatic start and hold circuit 117, the normally closed switch 157, a normally closed push button jog switch 164, and the solenoid 166 of the vacuum pilot valve 50. The components 129''', 157, 164 and 166 are connected in series across lines 114 and 115 in the lower circuit portion. A normally open relay contact 168' and a normally closed relay contact 169' are connected in series across the contact 129'''.

The circuit 171 indicates whether there is vacuum being established during the evacuating phase and comprises a normally open relay contact 129'''' controlled by relay coil 129 in the automatic start and hold circuit 117, a normally closed relay contact 168'' and a normally open relay contact 169''. Circuit 171 also has a normally open time-delay relay contact 148' controlled by relay coil 148 in circuit 146 which contact delays after coil 148 is energized, a relay coil 169 controlling relay contact 169'' and also relay contact 169' in circuit 163, and a bell 181. The components 129'''', 168'', 148' and 169 are connected in series across lines 114 and 115 in the lower circuit portion. The relay contact 169'' is connected across the relay contact 168'' and the bell 181 is connected across the relay coil 169.

The circuit 183 controls the operation of a fill head shift valve delay circuit described later and comprises normally open relay contacts 185' and 168''' and a relay coil 185 for controlling relay contact 185'. Contact 168''' and coil 185 are connected in series across line 115 and a line 189 which is connected by means of contact 129'''' to line 114. Contact 185' is connected across contact 168'''.

The circuit 191 is for the coolant pilot solenoid valve 52 and comprises a normally open time-delay relay contact 185'', a normally closed relay contact 169''' controlled by relay coil 169 in circuit 171, a normally closed double-pole jog fill switch 196 and the solenoid 198 of the coolant pilot valve 52. The contact 185'' is controlled by rely coil 185 in circuit 183 and delays after coil 185 is energized. The contacts 185'', 169''', closed contacts of switch 196 and solenoid 198 are connected in series across lines 189 and 115.

The circuit 201 is for the pilot solenoid valve 68 and comprises the solenoid 202 of pilot valve 68 which is normally connected across line 189 and 115 by means of the contacts 185'', 169''' and the normally closed jog fill switch 196. The normally open contacts of the jog fill switch 196 are for connecting both the solenoids 198 and 202 across lines 114 and 115 in the lower circuit portion.

The solenoid 205 of pilot valve 78 which controls the operation of the lubricating pump 76 is connected across line 115 and a line 206 which is connected by means of contacts 185'' and 169''' to line 189 and thence by line 189 and contact 129'''' to line 114.

The circuit 208 is for the pilot solenoid valve 72 and comprises a normally open relay contact 132'', a normally closed double-pole jog fill switch 211 and the solenoid 213 of pilot valve 72. The contact 132'', switch 211 and solenoid 213 are connected in series across lines 206 and 115. The normally open contacts of jog fill switch 211 are for connecting solenoid 213 across lines 114 and 115 in the lower circuit portion.

A relay coil 215 is provided for controlling the operation of a pullback circuit described later. Coil 215 is connected across lines 115 and 206.

The circuit 217 is a pullback circuit for checking atmospheric pressure in the system being filled and comprises normally open relay contacts 219' and 132''', a timed-delay relay contact 215', a relay coil 132 for controlling relay contact 132''', a relay contact 132'' in circuit 208 and relay contact 132' in circuit 117. Contacts 219' and 215' and coil 132 are connected in series across lines 189 and 115 and the contact 132''' is connected across contact 219'.

A relay coil 227 is provided for controlling the checking of vacuum. Coil 227 is connected across lines 189 and 115.

The circuit 229 controls the termination of the evacuating phase and comprises a vacuum switch 231 connected to the vacuum hose 44 at the station 12, a normally open time-delay relay contact 227' and a relay coil 168 which controls contact 168' in circuit 163, contact 168'' in circuit 171 and contact 168''' in circuit 183. The time-delay contact 227' is controlled by relay coil 227 and delays after coil 227 is energized. The switch 231, contact 227', and coil 168 are connected in series across lines 114 and 115 in the lower circuit portion.

The circuit 237 controls the termination of the withdrawal phase and comprises a pressure switch 239 which is located at station 12 and connected to the coolant hose 35 and a relay coil 134 controlling contact 134' in the automatic start and hold circuit 117. The switch 239 and coil 134 are connected in series across lines 114 and 115 in the lower circuit portion.

The circuit 243 controls the termination of the filling phase and comprises a pressure switch 246 which is located at station 12 and connected to coolant hose 35 and a relay coil 219 for controlling relay contact 219' in circuit 217. The switch 246 and coil 219 are connected in series across lines 114 and 115 in the lower circuit portion.

To illustrate the fluid filling process provided by the combined operation of all the apparatus described above and the results obtained, recourse is made to an actual apparatus constructed in accordance with the present invention in which the following settings were used for filling cooling systems that varied in volume from fifteen to twenty-two (15–22) quarts to ninety to ninety-five (90–95%) percent full without adjustments of the apparatus.

HYDRAULIC APPARATUS SETTINGS

Hydraulic component: Settings
  Regulator valve 28 _____ 30 p.s.i. gauge with no flow through the vacuum pump into vehicle coolant system.
  Metering valve 42 _____ Withdrawal time of 3 seconds.

PRESSURE SWITCH SETTINGS

| Switch | Open | Close (hold) |
| --- | --- | --- |
| 231 | 22'' Hg vac | 25'' Hg vac. |
| 239 | 1 p.s.i. gauge | 0 p.s.i. gauge. |
| 246 | 14 p.s.i. gauge | 15 p.s.i. gauge. |

NOTE.—1. Vacuum is measured in vacuum hose 44 at station 12. 2. Coolant pressure is measured at fill head 14.

TIME DELAY SETTINGS

| Purpose | Electrical component | Time (sec.) |
| --- | --- | --- |
| Delay for no vacuum alarm. | Time-delay relay contact 148'. | 20 |
| Valve shift delay | Time-delay relay contact 185''. | ½ |
| Delay before high pressure check. | Time-delay relay contact 215'. | 3 |
| Delay before vacuum check. | Time-delay relay contact 227'. | 5 |

Describing now the fluid filling process provided by the hydraulic and pneumatic components in the automatic operating sequence provided by the electric control circuit, the disconnect switch 98 is normally closed and the apparatus is conditioned for a filling operation by pressing the master start switch 137, as for example, at the beginning of an operator shift. Upon pressing the push button master start switch 137 the relay coil 128 is energized. Coil 128 remains energized after release of switch 137 by closing relay contact 128''. The energized relay coil 128 also closes relay contact 128''' so that the electrical power feeds through both lines 114 and 115 from the upper circuit portion 116 to the lower circuit portion 140. The hydraulic pump motor start switch 150 and the vacuum pump motor start switch 157 are normally closed. The hydraulic pump motor relay coil 111 and vacuum pump motor relay coil 100 are energized thereby closing the hydraulic pump motor relay contacts 111', 111'' and 111''' and the vacuum pump motor relay contacts 100', 100'' and 100''', respectively, to start the hydraulic pump motor 106 and vacuum pump motor 94. The energized relay coil 128 in the master start and stop circuit 136 also closes the relay contact 128' in the automatic start and hold circuit 117 to condition the latter circuit for operation. With the lower circuit portion 140 energized, all the control components therein are ready to operate. Only the solenoid 166 of the vacuum pilot valve 50 is energized with the vacuum pump on and relay coil 129 de-energized and the vacuum pilot valve 50 closes the fill head vacuum valve 45 so that both the vacuum and coolant fill head valves 45 and 46 are closed to disconnect the vacuum and coolant hoses 44 and 35 from the fill head line 47. Since pilot valve 72 is de-energized valve 32 is open and connects the main coolant line 26 to coolant hose 35 which is blocked at the fill head and valve 41 is closed and disconnects coolant hose 35 and vacuum line 40. Since the pilot valve 68 is de-energized the vacuum pump coolant feed valve 34 is open and the coolant supplied to the main coolant line 26 from the hydraulic pump 22 flows to the vacuum pump and is returned to the fluid tank. The vacuum pump 38 establishes and maintains a vacuum in line 40 and connected vacuum hose 44 and the apparatus is conditioned for a filling operation.

The operator connects the fill head 14 to the radiator of the automobile to be filled as it comes down the assembly line and presses the start switch 126 in the automatic cycle start and hold circuit 117. Relay coil 129 is energized since the relay contact 128' has been closed. The coil 129 remains energized after the operator releases switch 126 by closing relay contact 129'. The relay contact 129''' in the vacuum pilot valve circuit 163 is opened by the energized relay coil 129 causing de-energization of the solenoid 166 so that the pilot valve 50 opens the fill head vacuum valve 45. Air is then exhausted from the vehicle cooling system through the open valve 45 by vacuum pump 38. The relay contact 129'''' is closed by the energized relay coil 129 so that the relay coil 227 which controls the time-delay relay contact 227' in vacuum control circuit 229 is energized. The time-delay relay contact 227' closes after five seconds so that the vacuum switch 231 is ready to terminate the evacuating phase. The five-second delay of contact 227' is to hold circuit 229 open long enough to permit the vacuum switch 231 to be opened at 22'' Hg vacuum by the decrease in vacuum in vacuum hose 44 upon connection by valve 45 to the cooling system, the vacuum switch having previously been closed at 25'' Hg vacuum since the valve 45 was closed. The relay contact 129'' in the automatic cycle start and hold circuit 146 is also closed by the energized relay coil 129 so that the relay coil 148 is energized.

During a normal evacuating phase in which there are no leaks in the cooling system, vacuum builds in the cooling system and is sensed by the vacuum switch 231 connected to the vacuum hose. The vacuum switch 231 which opened when evacuation of the cooling system began closes when 25'' Hg vacuum is reached at the fill head causing energization of relay coil 168 which opens relay contact 168'' so that alarm 181 will not sound. In the normal cycle, the evacuating phase was found to take approximately eleven seconds for the cooling systems being filled.

If the vehicle cooling system leaks and vacuum does not build up and actuate (close) the vacuum switch 231 in less than twenty seconds, the time-delay relay contact 148' operated by the energized relay coil 148 will close before the relay contact 168" opens causing the alarm 181 to sound. The twenty-second delay of contact 148' thus provides about double the time needed to establish the desired vacuum in a nonleaking cooling system. The alarm 181 will continue to sound in the event relay contact 168" is subsequently opened upon closing of the vacuum switch 231 by the energization of relay coil 169 which closes contact 169" so that power is delivered by contact 169" to the alarm 181. The energized relay coil 169 also opens relay contact 169''' in circuit 191 to prevent energization of solenoid 198 of the coolant pilot valve 52 so that the fill head collant valve 46 remains closed to prevent any coolant filling operation. The no vacuum alarm 181 will continue to sound until the operator presses the operator stop switch 127 in the automatic start and hold circuit 117.

When there is no leakage and the vacuum switch 231 closes with the time-delay relay contact 227' having timed out, the energized relay coil 168 closes relay contact 168' so that solenoid 166 of the vacuum pilot valve 50 is energized to close the fill head vacuum valve 45. Vacuum is maintained in the vacuum hose 44 throughout the remaining fluid filling and withdrawal phases of the cycle and relay coil 168 remains energized. The energized relay coil 168 also closes the relay contact 168''' to energize the relay coil 185. The energized relay coil 185 closes relay contact 185' which remains closed by delivering power to its coil 185. The time-delay relay contact 185" which is also operated by the energized relay coil 185 closes after one-half second to supply power to both solenoids 198 and 202. With solenoid 198 of the pilot valve 52 energized the fill head coolant valve 46 opens so that the coolant is delivered to the cooling system. The one-half second delay of relay contact 185" times the opening of the fill head coolant valve 46 with the closing of the fill head vacuum valve 45 so that there is no overlap. With solenoid 202 of the pilot valve 68 energized, the valve 34 is closed so that all the coolant delivered by the hydraulic pump 22 is available to fill the cooling system. The coolant is delivered to the cooling system at a constant volumetric rate since the positive displacement pump 22 is being driven at a constant speed. The closing of contact 185" also energized solenoid 205 so that pilot valve 78 delivers air to the lubricating pump 76 to inject lubricant into the fluid tank 16 during the filling phase. The closing of time-delay relay contact 185" also energized relay coil 215 which controls time-delay relay contact 215'. The time-delay relay contact 215' closes after three seconds and is to hold circuit 217 open long enough to permit the high pressure switch 246 to be opened at 14 p.s.i. gauge by the initial decrease in coolant pressure in coolant hose 35 upon connection by valve 46 to the evacuated cooling system, the pressure switch 246 having previously been closed at 15 p.s.i. gauge since the valve 46 was closed.

In the overfilling phase the coolant flows into the cooling system and compresses the small amount of air remaining from the partial evacuation. About half of the available coolant pressure is dissipated in overcoming fluid friction in the coolant hose 35 and only approximately 15 p.s.i. gauge reaches the cooling system's inlet at the radiator. When the coolant pressure in the cooling system reaches 15 p.s.i. gauge the pressure switch 246 closes to energize relay coil 219. The filling phase was found to take approximately sixteen seconds for the cooling systems being filled. The energized relay coil 219 closes the relay contact 219' in circuit 217 to energize the relay coil 132 which closes the relay contact 132''', the relay contact 215' having previously timed in. Contact 132''' remains closed by delivering power to its coil 132. The energized relay coil 132 also closes the relay contact 132" to energize the solenoid 213 of pilot valve 72 which simultaneously closes valve 32 and opens valve 41 whereby the filling phase is terminated and the withdrawal phase is begun. The vacuum pump 38 then pulls back the excess coolant from the coolant system through the coolant hose 35 and metering valve 42 and reduces the coolant system pressure.

The low pressure switch 239 is open since cooling system pressure is above 1 p.s.i. gauge and the withdrawal of the excess coolant and reduction in cooling system pressure continues until the low pressure switch closes at 0 p.s.i. gauge which indicates an atmospheric condition in the cooling system. The withdrawal time is controlled by the metering valve 42 and was approximately three seconds for the cooling systems being filled. The closing of switch 239 energizes relay coil 134. The energized relay coil 134 opens the relay contact 134' in the automatic start and hold circuit 117 and since the relay contact 132' was opened by the energized coil 132 during the filling cycle, the energizing circuit for the relay coil 129 is opened. Thus, relay coils 148, 185, 215, 132, 134, 168, 227 and 219 are all deenergized and all solenoids except solenoid 166 of the vacuum pilot valve 50 are de-energized so that the apparatus reverts to the off or ready condition for the next cooling system to be filled.

Since the cooling system pressure is in balance with the atmosphere the fill head can be disconnected from the radiator fill neck without spillage with the coolant level at the bottom of the fill neck. The total cycle time from the beginning of the evacuating phase to ending of the withdrawal phase was thirty and one-half seconds which is typical of the short filling time provided by the present invention.

The operator can override the automatic cycle to stop the hydraulic pump motor 106 by opening the switch 150 in the hydraulic pump motor circuit 149. The operator can also stop the vacuum pump motor 94 by opening the switch 157 in the vacuum pump motor circuit 159 which open switch will also cause de-energization of the vacuum pilot solenoid valve 50 to open the fill head vacuum valve 45.

The operator can override the automatic operation of the fill head coolant valve 45 by opening jog switch 164 to de-energize solenoid 166 and thus hold valve 45 open. The operator can also override the automatic operation of the fill head coolant valve 46 and the vacuum pump feed valve 34 by operating jog fill switch 196 to connect line 114 to both solenoids 198 and 202 so that the fill head coolant valve 46 is held open and the vacuum pump feed valve 34 is held closed. The operator can also override the automatic operation of the valves 32 and 41 by operating the jog fill switch 211 in circuit 208 to directly connect line 114 to solenoid 213 to hold valve 32 closed and the valve 41 open for coolant withdrawal.

The above described preferred embodiment is illustrative of the process and the apparatus according to the present invention which may be modified within the scope of the appended claims.

I claim:
1. A process for filling a fluid receptacle normally containing a first fluid comprising the steps of
 (a) evacuating the receptacle so that a predetermined quantity of the first fluid remains in the receptacle,
 (b) filling the receptacle with a second fluid under superatmospheric pressure so that the first fluid is compressed and the receptacle is overfilled, and
 (c) withdrawing fluid until the receptacle reaches atmospheric pressure.

2. The process set forth in claim 1 and metering the flow rate of the fluid withdrawn in step (c).

3. The process set forth in claim 1 and preventing the filling in step (b) in the event a predetermined vacuum is not established in a predetermined time interval during step (a).

4. The process set forth in claim 1 and filling in step (b) at a constant volumetric flow rate.

5. The process set forth in claim 1 and delaying the initiation of step (b) after termination of step (a) so that there is no overlap between steps (a) and (b).

6. The process set forth in claim 1 and terminating the evacuation in step (a) and initiating the filling in step (b) in response to a predetermined vacuum established in the receptacle during step (a), terminating the filling in step (b) and initiating the withdrawal in step (c) in response to a predetermined pressure established in the receptacle during step (b), terminating the withdrawal in step (c) in response to atmospheric pressure being established in the receptacle during step (c).

7. The process set forth in claim 1 and automatically terminating the evacuation in step (a) and after a predetermined time delay initiating the filling in step (b) in response to a predetermined vacuum established in the receptacle during step (a), automatically terminating the filling in step (b) and initiating the fluid withdrawal in step (c) in response to a predetermined pressure established in the receptacle during step (b), automatically terminating the evacuation in step (a) and preventing the filling in step (b) in the event the receptacle leaks during evacuation in step (a), automatically terminating the fluid withdrawal in step (c) in response to atmospheric pressure being established in the receptacle during step (c).

8. A process for filling a motor vehicle cooling system comprising the steps of
   (a) evacuating the cooling system of air until a predetermined vacuum is reached and a fraction of the air remains in the cooling system,
   (b) automatically terminating the evacuation and initiating filling the cooling system with coolant at a predetermined superatmospheric pressure in response to the predetermined vacuum being reached in step (a) so that the remaining air in the cooling system is compressed and the cooling system is overfilled with coolant,
   (c) automatically terminating the evacuation of the system in step (a) in the event leakage occurs in the cooling system and the predetermined vacuum is not reached after a predetermined time interval and preventing the subsequent filling in step (b),
   (d) automatically terminating the filling in step (b) and initiating withdrawal of the excess coolant in response to superatmospheric pressure being reached in the system during step (b), and
   (e) automatically terminating the withdrawal in step (d) in response to atmospheric pressure being established in the system during step (d).

9. The process set forth in claim 8 and filling the cooling system in step (b) at a constant volumetric flow rate, metering the withdrawal flow rate in step (c).

10. A fluid filling apparatus for filling a fluid receptacle normally containing a first fluid comprising the combination of fluid evacuating means for evacuating the receptacle so that a predetermined quantity of the first fluid remains in the receptacle, fluid filling means for filling the receptacle with a second fluid under pressure so that the remaining first fluid is compressed and the receptacle is overfilled, and fluid withdrawal valve means for connecting said fluid filling means and said fluid evacuating means to withdraw fluid from the receptacle until atmospheric pressure is reached in the receptacle.

11. The fluid filling apparatus set forth in claim 10 and an electrical control circuit operatively connected to said fluid evacuating means, said fluid filling means and said fluid withdrawal valve means for automatically terminating the evacuation and initiating the fluid filling in response to a predetermined vacuum being established in the receptacle during the evacuation, automatically terminating the fluid filling and terminating the fluid withdrawal in response to a predetermined superatmospheric pressure being established in the receptacle during the fluid filling, and automatically terminating the fluid withdrawal in response to atmospheric pressure being established in the receptacle during the fluid withdrawal.

12. The fluid filling apparatus set forth in claim 10 and said evacuating means comprising a vacuum pump and vacuum control valve means, said vacuum control valve means operable in an open condition to connect and in a closed condition to disconnect said vacuum pump and the receptacle, said fluid filling means comprising a pressure pump and series connected first and second fluid control valve means, said first and second fluid control valve means operable when both are in an open condition to connect said pressure pump and the receptacle, said first fluid control valve means intermediate said pressure pump and said second fluid control valve means and operable in a closed condition to disconnect said pressure pump and said second fluid control valve means, said second fluid control valve means operable in a closed condition to disconnect said first fluid control valve means and the receptacle, said fluid withdrawal valve means comprising a metering valve and fluid withdrawal control valve means, said fluid withdrawal control valve means operable in an open condition to connect said fluid filling means between said first and second fluid control valve means through said metering valve to said fluid evacuating means between said vacuum pump and said vacuum control valve means and operable in a closed condition to disconnect said fluid filling means and said fluid evacuating means.

13. The fluid filling apparatus set forth in claim 12 and an electrical control circuit operatively connected to all said valve means for automatically conditioning all said valve means to disconnect both said pressure pump and the receptacle and said fluid filling means and said fluid evacuating means and connect said vacuum pump to establish vacuum in the receptacle, automatically conditioning all said valve means to disconnect said vacuum pump and the receptacle, disconnect said fluid filling means and said fluid evacuating means and connect said pressure pump to fill the receptacle when a predetermined vacuum is established in the receptacle, automatically conditioning all said valve means to disconnect said pressure pump and the receptacle and connect said vacuum pump through said metering valve to withdraw fluid from the receptacle when a predetermined superatmospheric pressure is reached in the receptacle, and automatically conditioning all said valve means to disconnect both said vacuum pump and said pressure pump from the receptacle when atmospheric pressure is reached in the receptacle.

14. A fluid filling apparatus for filling a motor vehicle cooling system comprising the combination of a vacuum pump, a pressure pump, a fill head having a single outlet, a vacuum hose connected to said vacuum pump, a coolant hose, a first valve operable in an open position to connect and in a closed position to disconnect said pressure pump and said coolant hose, a second valve operable in an open position to connect and in a closed condition to disconnect said coolant hose and said vacuum pump, and said fill head housing both a third valve operable in an open position to connect and in a closed position to disconnect said vacuum hose and said fill head outlet and a fourth valve operable in an open position to connect and in a closed position to disconnect said coolant hose and said fill heat outlet.

15. The apparatus set forth in claim 14 and control means operatively connected to all said valves for simultaneously opening said first and third valves and closing said second and fourth valves, simultaneously closing said second and third valves and opening said first and fourth valves, and simultaneously closing said first and third valves and opening said second and fourth valves.

16. The apparatus set forth in claim 15 and said third and fourth valves each having a separate solenoid operated pilot valve for establishing the valves' open and closed valve positions, said first and second valves having a single solenoid operated pilot valve for establishing the valves' open and closed positions.

17. The apparatus set forth in claim 15 and a metering valve connected between said second valve and said vacuum hose.

18. The fluid filling apparatus set forth in claim 15 and an electrical control circuit operatively connected to control all said valves for automatically positioning said first and third valves in their open positions and said second and fourth valves in their closed positions so that the vacuum pump is connected to establish vacuum in the receptacle and said pressure pump is disconnected from the receptacle, automatically positioning said third valve in its closed position and said fourth valve in its open position while maintaining said first valve in its open position and said second valve in its closed position when a predetermined vacuum is established in the receptacle, automatically positioning said first valve in its closed position and said second valve in its open position while maintaining said fourth valve in its open position and said third valve in its closed position when a predetermined superatmospheric pressure is reached in the receptacle, and automatically conditioning said first valve in its open position, said second valve in its closed position and said fourth valve in its closed position while maintaining said third valve in its closed position when atmospheric pressure is reached in the receptacle.

19. The fluid filling apparatus set forth in claim 18 and said electrical circuit including time-delay means for delaying positioning of said fourth valve in its open position after the positioning of said third valve in its closed position, vacuum checking means operable to automatically position said third valve in its closed position, said second and fourth valves in their closed positions and said first valve in its open position when the predetermined vacuum is not established in the receptacle after a predetermined time interval.

20. The fluid filling apparatus set forth in claim 15 and said pressure pump operable to deliver a constant volumetric flow rate, a regulator valve for regulating the pressure of the fluid discharged from said pressure pump, a metering valve connected between said second valve and said vacuum hose.

References Cited
UNITED STATES PATENTS 2,756,915    7/1956    Ritter _____ 141—7 X
3,331,404    7/1957    Gehring et al. ____ 141—119 X HOUSTON S. BELL, JR., *Primary Examiner.*

U.S. Cl. X.R.

141—59, 115

UNITED STATES PATENT OFFICE
CERTIFICATE OF CORRECTION

Patent No. 3,425,464                                                    February 4, 1969

Walton Hughes

It is certified that error appears in the above identified patent and that said Letters Patent are hereby corrected as shown below:

Column 1, line 29, "syestem" should read -- system --. Column 2, line 27, "with" should read -- and --; line 37, after "FIGURE" insert -- 2 --. Column 7, line 49, after "pump" insert -- or --. Column 12, line 64, "heat" should read -- head --.

Signed and sealed this 31st day of March 1970.

(SEAL)
Attest:

Edward M. Fletcher, Jr.                          WILLIAM E. SCHUYLER, JR.
Attesting Officer                                           Commissioner of Patents